Aug. 12, 1941.   C. F. RAUEN   2,251,956
SPRAG
Filed Sept. 13, 1933   4 Sheets-Sheet 2
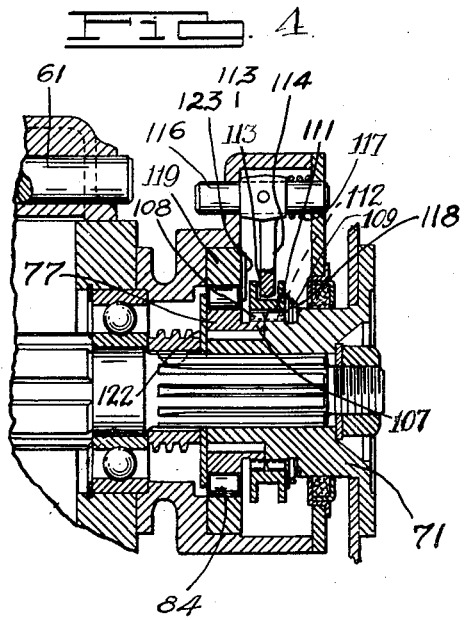
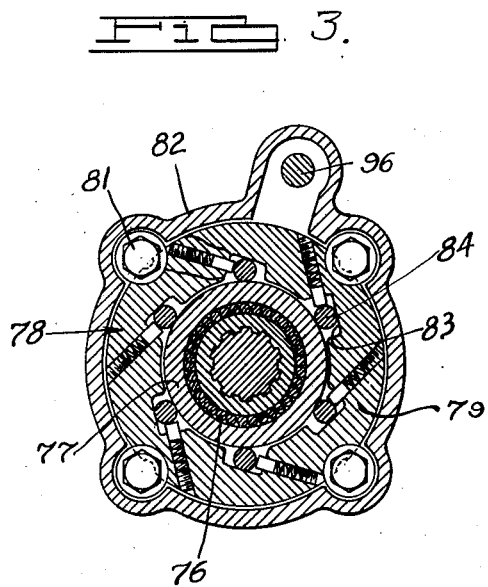
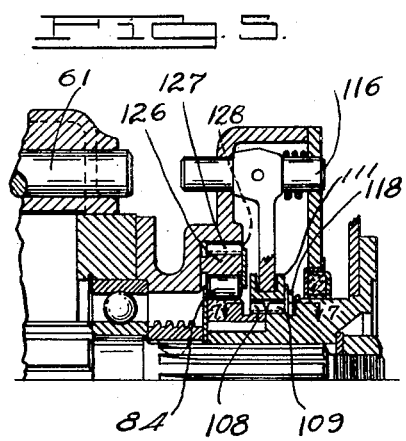
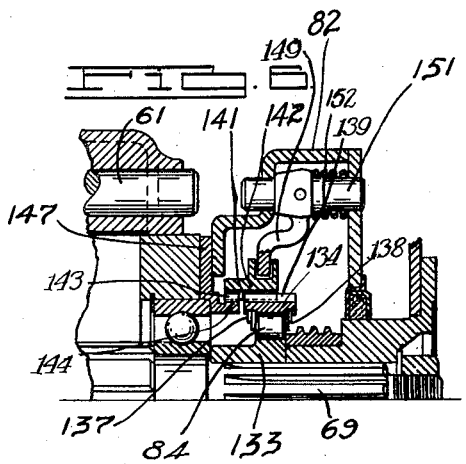
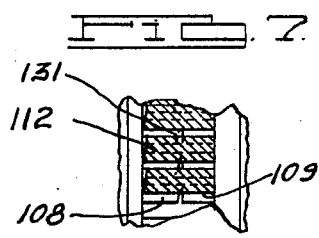
INVENTOR.
Carl F. Rauen.
BY
ATTORNEY.

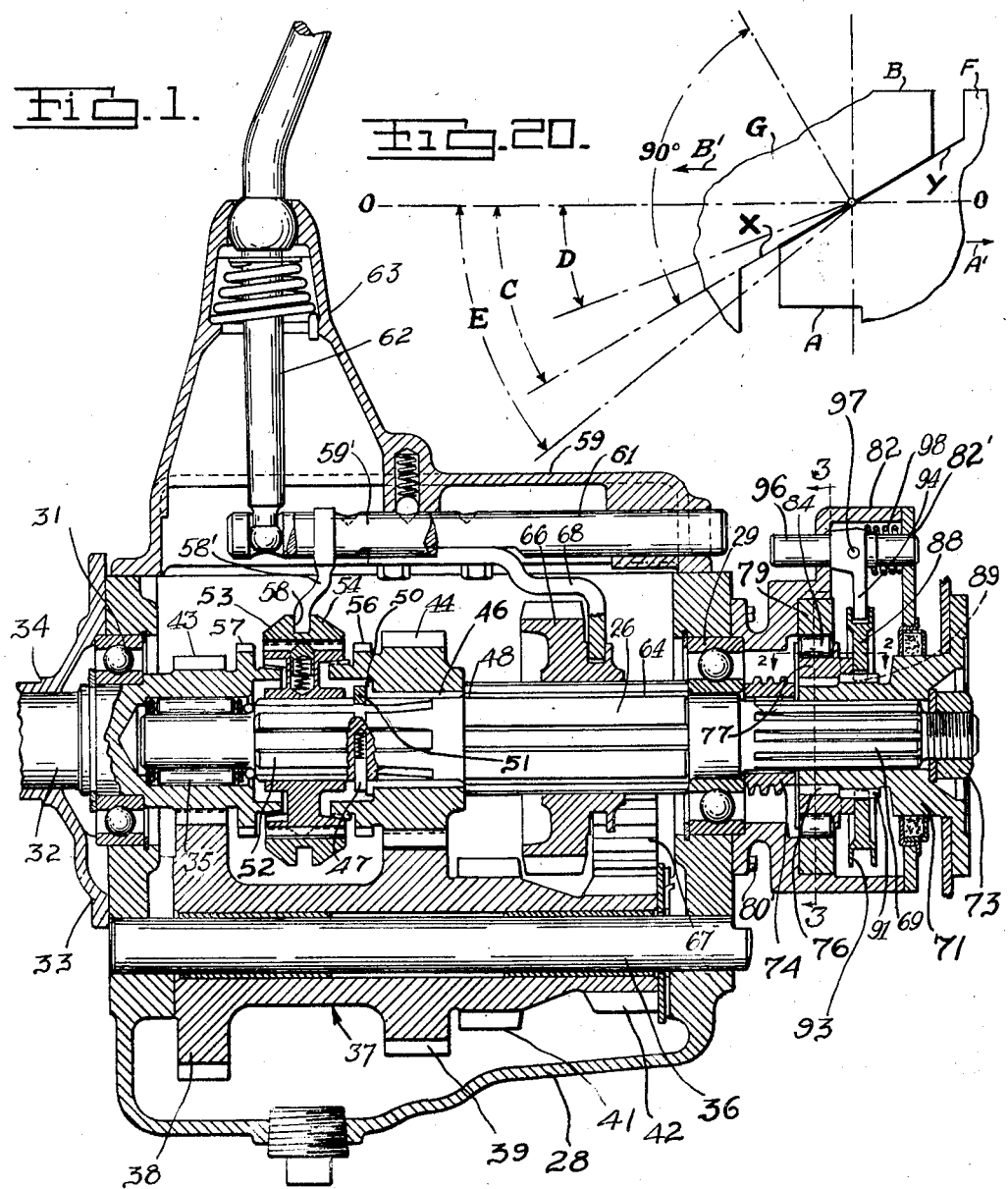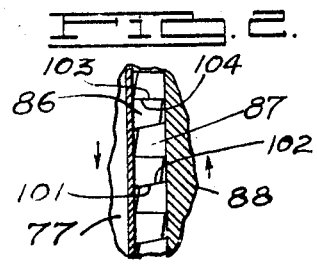

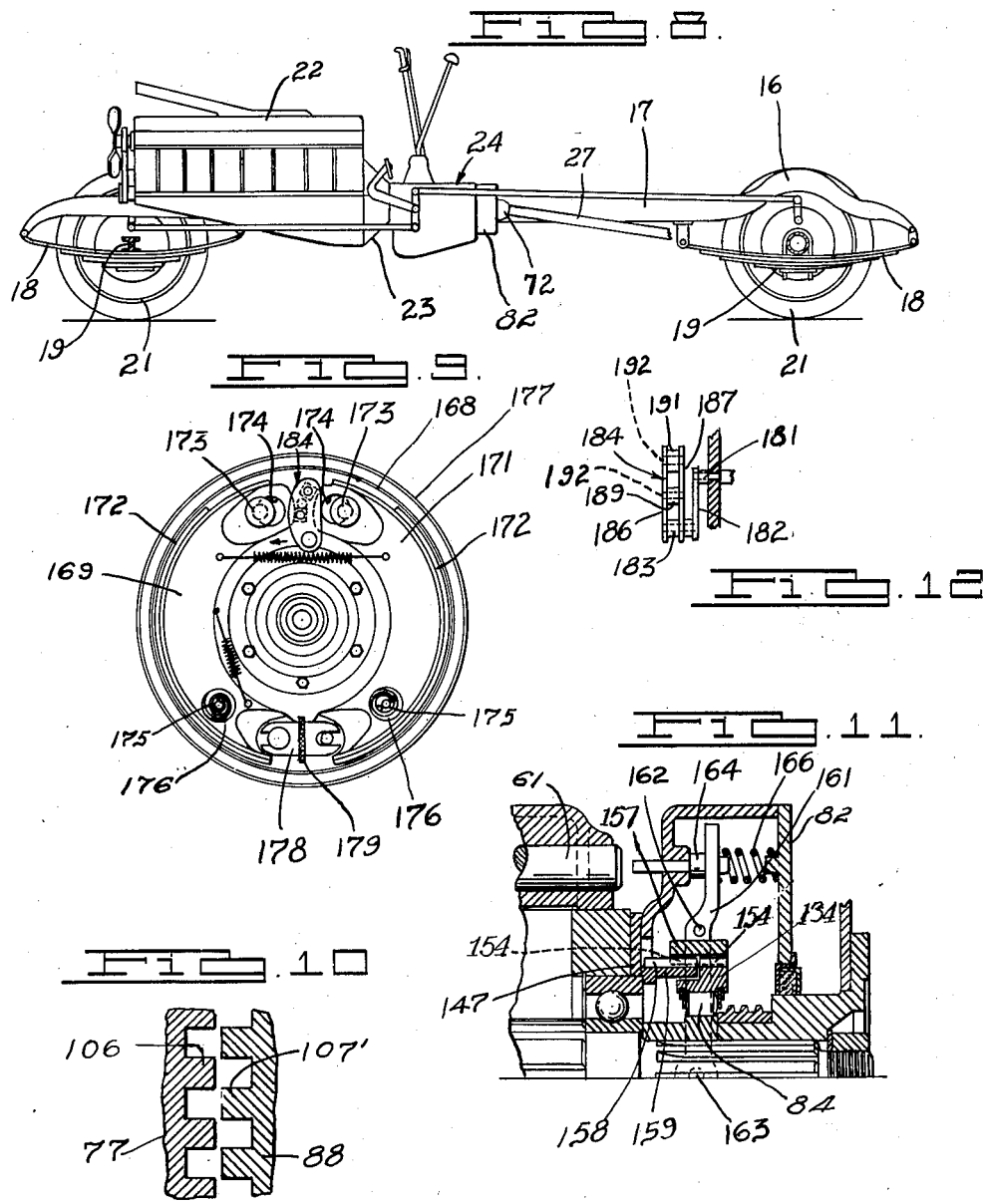

Aug. 12, 1941.   C. F. RAUEN   2,251,956
SPRAG
Filed Sept. 13, 1933   4 Sheets-Sheet 4
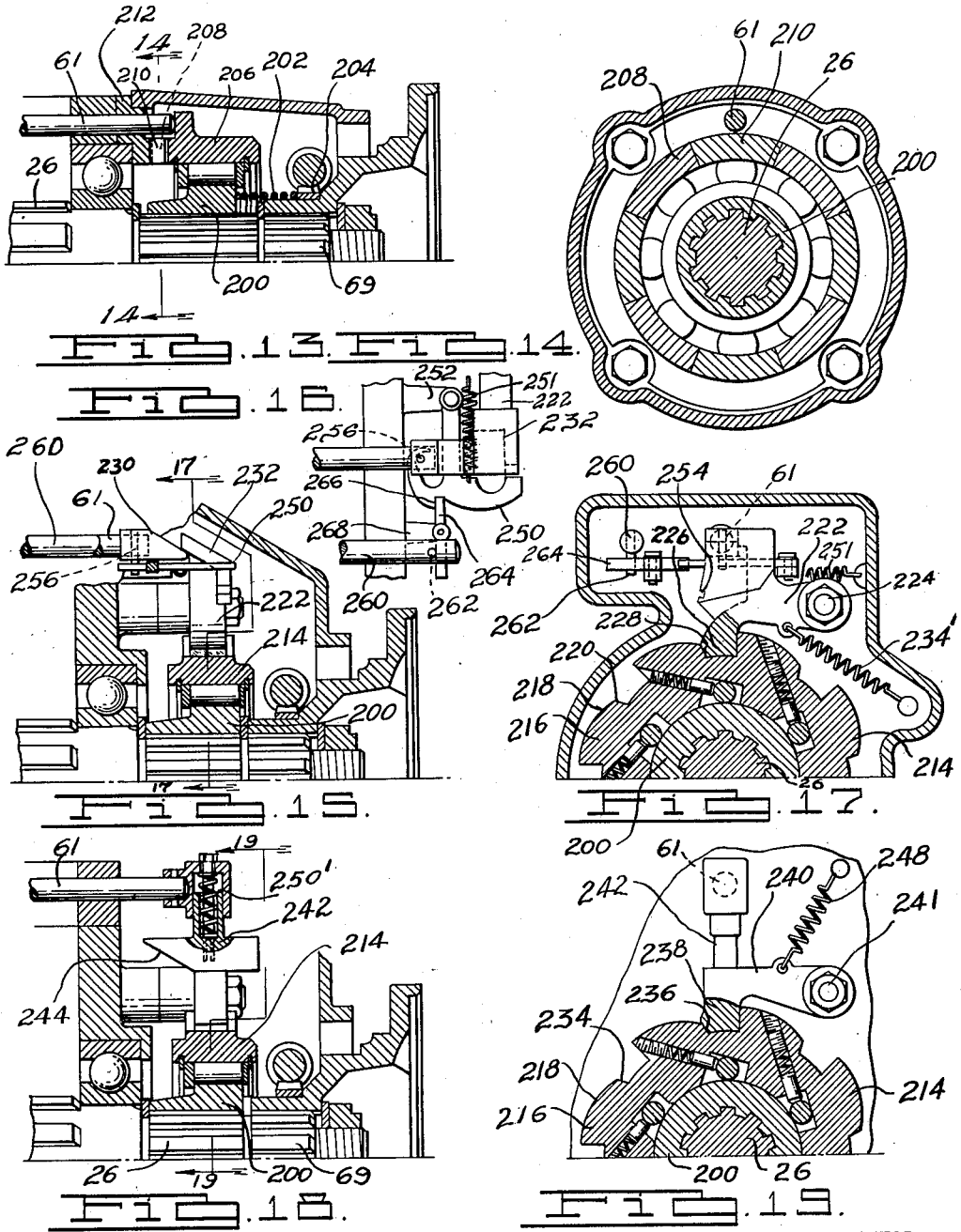
INVENTOR.
Carl F. Rauen.
BY
ATTORNEY.

Patented Aug. 12, 1941

2,251,956

UNITED STATES PATENT OFFICE 2,251,956

SPRAG

Carl F. Rauen, Grosse Pointe, Mich.

Application September 13, 1933, Serial No. 689,204

28 Claims. (Cl. 192—4)

This invention relates to unidirectional braking devices and has particular relation to devices generally called anti-reverse mechanisms or sprags, especially applicable for preventing motor vehicles from moving rearwardly when movement in such direction is undesirable.

This application is a continuation in part of my application for "Brake," Serial No. 498,263, filed November 26, 1930.

An object of the invention is to provide means for overcoming the frictional force set up between the several parts of a sprag mechanism when this latter is employed in holding the vehicle in a stationary position upon any inclined surface such as a hill, so that any desired change in the gear ratio may be effected.

Another object of the invention is to provide a motor vehicle with a particular type of braking mechanism which will move the vehicle slightly forward when applied, and to such an extent that the sprag or anti-reverse mechanism thereon can be released without the exertion of undue force.

Another object of the invention is to provide the propeller shaft of a motor vehicle with a mechanism which will permit the operation of such shaft only in one direction, but which can be easily released when such is desirable and notwithstanding the large amount of force which may be exerted thereagainst when the vehicle tends to move rearwardly.

Another object of the invention is to provide a motor vehicle propeller shaft with an overrunning or one way clutch mechanism having an element operative against the motor vehicle frame structure through a releasable shifting clutch, and which has means incorporated therein for permitting the operation of the releasing mechanism manually and with a less amount of applied force than would ordinarily be required in overcoming the frictional resistance to movement of such parts.

Another object of the invention is to provide, in the transmission mechanism of a motor vehicle or elsewhere, a sprag device which cannot be engaged when the vehicle is already moving rearwardly, except at a relatively low speed, but which will automatically be engaged when the gear shift lever is in other than reverse position but after the vehicle otherwise has been stopped.

Another object of the invention is to provide means for rendering the sprag device inoperative when the shift lever of the transmission is returned to neutral position and permitted to remain in such position subsequent to moving the shift lever out of reverse position, so that the vehicle in which the device is incorporated may be moved rearwardly, whenever such is desirable, otherwise than through the agency of the engine of the vehicle.

The invention contemplates the use, on the propeller shaft of a motor vehicle, of an overrunning clutch or some equivalent locking device, which will permit the rotation of the propeller shaft in a direction suitable for driving the vehicle forwardly, but which will secure the shaft rigidly to the vehicle frame when the propeller shaft tends to rotate in the opposite direction. This condition might occur should the vehicle tend to roll rearwardly under the influence of some force other than the motive power provided by the engine. In order to permit the driving of the vehicle rearwardly under the influence of the engine, the clutch is equipped with a shift mechanism under the manual control of the vehicle operator and which will render the clutch inoperative to prevent the opposite rotation of the shaft under such conditions.

In devices employed heretofore, this manually actuated control for rendering the overrunning or one way clutch inoperative, has worked very well when the vehicle has been standing still upon level ground, where there was no tendency for it to roll rearwardly, but with the vehicle facing upwardly in an inclined position, the overrunning clutch mechanism would tend to become locked in position to prevent the rearward motion of the vehicle, due to the frictional force generated between the parts and in many instances it has been practically impossible to operate the shift mechanism to permit the vehicle to move rearwardly.

This invention modifies the operation of the overrunning clutch mechanism under such circumstances and renders it easily releasable under the influence of the shift mechanism, notwithstanding the fact that the mechanism may be holding the vehicle against rearward motion.

This result is accomplished in one instance by providing a shifting clutch, between the stationary element of the overrunning clutch and the vehicle frame, which has an angle of rest or repose such that the elements of the shifting clutch can be easily disconnected even when the clutch is being employed in preventing the rearward rotation of the vehicle.

This result also may be accomplished by employing a particular type of vehicle braking mechanism which has the property of moving a vehicle forwardly to a slight extent, when applied. Such forward movement tends to take the load off of the overrunning clutch or sprag device, and thereafter it can be released to permit the vehicle to roll backwardly.

For a better understanding of the invention, reference may now be had to the accompanying drawings forming a part of this specification, in which:

Fig. 1 is a longitudinal sectional view of an automobile transmission mechanism having associated therewith a sprag device embracing the principles of this invention;

Fig. 2 is a fragmentary sectional view of the clutch teeth employed in the sprag structure disclosed by Fig. 1 and as the latter might appear substantially on line 2—2 thereof;

Fig. 3 is a vertical sectional view through the overrunning clutch mechanism of the sprag device, taken substantially in the plane of line 3—3 of Fig. 1;

Figs. 4, 5, 6 and 11 are fragmentary sectional views, similar to Fig. 1, of slightly modified forms of the invention disclosed by the preceding figures;

Fig. 7 is a fragmentary sectional view taken substantially on line 7—7 of Fig. 5 and illustrating the shape of the various engaging teeth employed in the shifting clutch mechanism embraced in that structure;

Fig. 8 is a view of a motor vehicle chassis employing a power transmission mechanism embracing the principles of the invention;

Fig. 9 is a view of a vehicle brake mechanism which may be employed in the motor vehicle disclosed by Fig. 8 in the practice of the principles of the invention;

Fig. 10 is a fragmentary sectional view illustrating a certain type of clutch engaging teeth which may be employed in a sprag mechanism such as that disclosed herein;

Fig. 12 is a fragmentary sectional view of the brake mechanism shown by Fig. 9 and particularly illustrating the brake shoe actuating mechanism embraced therein;

Fig. 13 is a fragmentary sectional view of a slightly modified form of the invention disclosed in the preceding figures;

Fig. 14 is a section on the line 14—14 of Fig. 13 and looking in the direction of the arrows;

Fig. 15 is a fragmentary sectional view illustrating another modified form of the invention;

Figure 16 is a top plan view of the modification illustrated in Fig. 15 and showing mechanism for rendering the sprag device temporarily inoperative;

Fig. 17 is a cross sectional view taken on the line 17—17 of Fig. 15;

Fig. 18 is a fragmentary sectional view illustrating another modification of the invention;

Fig. 19 is a cross sectional view on the lines 19—19 of Fig. 18 and looking in the direction of the arrows; and Fig. 20 is a diagrammatic illustration of tooth means which embody the angle of rest or repose.

Referring particularly to Fig. 8, there is disclosed a motor vehicle chassis 16 embracing a frame 17, the front and rear ends of which are supported upon springs 18, axles 19, and road wheels 21. The forward end of the frame 17 has supported thereon, a motor vehicle engine 22 having a housing enclosed clutch mechanism 23 at the rear end thereof, and which in turn is operatively associated with a gear transmission mechanism 24, supported rearwardly thereon. Extending rearwardly from and supported by the transmission mechanism 24, is a sprag mechanism from which in turn projects a propeller shaft 27, the rear end of which is operatively associated with the vehicle rear axle 19 employed in driving the road wheels 21.

As is best shown by Fig. 1, the transmission mechanism 24 comprises a casing 28 having bearings 29 and 31 provided at the front and rear ends thereof, and in which are journaled respectively, the forward end of the driven shaft 26, which may be considered as part of the propeller shaft 27, Fig. 8, above referred to, and the rear end of a shaft 32 operatively associated with the driven element employed in the clutch mechanism 23. A cap 33 provided with a bearing portion 34 is employed on the shaft 32 forwardly of the bearing 31, to prevent escape of lubricant from the interior of the casing 28 and to hold more rigidly the shaft 32 in operative position. The forward end of the shaft 26 is journaled within the adjacent hollow end of the shaft 32 on roller bearings indicated at 35.

Journaled on a shaft 36, the opposite ends of which are secured in openings formed in the casing 28 immediately below the bearings 29 and 31, is a gear cluster 37 comprising a plurality of gears 38, 39, 41 and 42 and which are adapted to be employed in various combinations in driving the propeller shaft 27 from the shaft 32. For example, the cluster 37 is continuously driven through the gear 38 by a gear 43 formed on the shaft 32 behind the bearing 31, and the gear 39 continuously drives a gear 44 which is mounted upon a bushing 46, secured loosely to the forward end of the shaft 26 and between a shoulder 48 thereon and a shoulder 59 formed on one end of the bushing 46. A snap ring 51 and a radially projecting pin 47 retain the bushing 46 against lateral displacement on the shaft 26.

Secured upon a splined portion 52 of the shaft 26, located forwardly of the gear 44, is a synchronizing shifter member 53, having a sliding element 54 thereon with internal teeth, the opposite ends of which are adapted to cooperate with teeth 56 and 57 formed on the adjacent ends of the gears 44 and 43, respectively. When the ring 54 is in contact with the teeth 57, the shaft 32 drives the shaft 27 directly at engine speed, whereas when the ring is in contact with teeth 56, the shaft 27 is driven in second speed through the gears 43, 38, 39 and 44. In order to be able to move the ring 54 from one of the aforesaid positions to the other, the outer surface thereof is provided with an annular groove 58 in which a fork 58' is adapted to run. This fork is secured rigidly on the lower surface of a bar 59' which is slidably mounted in a cover portion 59 of the casing 28 in parallel relation to a bar 61 shown as slidably mounted in openings formed therein. The aforesaid bars are selectively operated by a gear shift lever 62 which is pivotally mounted intermediate its ends in the upper extremity of a gear shift lever supporting housing 63.

Between the gear 44 and the bearing 29, the shaft 26 is splined, as is indicated at 64, for slidably supporting a gear 66 adapted to be moved thereon and into mesh with the gear 41 of the cluster 37, and a reverse idling gear 67 mounted in the casing 28 at one side of the shaft 27. The gear 67 is adapted normally to remain in mesh with the gear 42 of the cluster 37 and, when in engagement with the gear 66, drives the shaft 27 in such manner as to move the vehicle rearwardly. When the gear 66 is in engagement with the gear 41 and in which event the shifter mechanism 53 is in neutral position, the shaft 27 is driven in such a manner as to drive the vehicle forwardly at low speed. The position of the gear 66 is determined by a fork 68 secured on the lower part of the rod 61, which is in turn controlled by the gear shift lever 62.

The portion of the shaft 26 beyond the bearing 29 is splined, as is indicated at 69, and has disposed thereon an internally splined sleeve 71 of a universal joint 72. The sleeve 71 is held in position by a nut 73 threaded upon the rear end of the shaft 26 and which holds the sleeve against an annular speedometer gear 74 located between the sleeve and the inner race of the bearing 29. Mounted on roller bearings 76 on the outer surface of the forward end of the sleeve 71 is an internal element 77 of an overrunning or one-way clutch, brake, device, mechanism or connection 78, the outer element 79 of which is rigidly secured by bolts 81, to the sprag element casing 82. The forward end of this casing is rigidly secured by bolts 80' or other suitable means, to the rear end of the transmission casing 28 which is in turn rigidly secured to the vehicle frame as has been hereinbefore described.

Formed around the inner periphery of the outer element 79 of the overrunning clutch are a plurality of notches 83, the outer surfaces of which are all inclined in the same direction with respect to the outer surface of the inner clutch element 77. In each of these notches there is located a roller element 84 which is small enough to turn freely between the outer surface of the inner element 77 and the inclined surfaces of the notches 83 at the deeper end thereof, but will be confined between said surfaces at the shallower end of the notches to lock the inner element against rotation in a clockwise direction, looking at Fig. 3. The direction of inclination of these notches is such that the inner element of the clutch may rotate in a counter-clockwise direction, looking at Fig. 3, when the vehicle is driven forwardly, but will be clamped to the outer element 79, which is rigidly affixed to the vehicle frame, by the rollers 84 when the direction of motion of the vehicle is reversed, provided the gears are set for a forward speed or are in neutral except after being shifted to the foregoing position from reverse, as hereinafter explained.

In order to provide means for releasing the inner element 77 of the sprag device to permit the vehicle to move rearwardly when desired, the side of the element 77 remote from the transmission casing is provided with a plurality of laterally projecting teeth 86 which are adapted to mesh with an equal number of similar teeth 87 projecting from the adjacent side of a circular shifter member or ring 88. The inner periphery of this member is provided with a plurality of radially inwardly projecting teeth 89, which in turn mesh with a plurality of teeth 91 formed on the outer surface of the sleeve element 71 directly inside the shifter member. The teeth 91 are wide enough to permit the ring or disc 88 to be moved until the teeth 87 are brought into engagement with the teeth 86 or released therefrom by movement away from the inner element 77.

The disc 88 is movable upon the teeth 91 by the provision, in the outer surface thereof, of an annular groove 93 adapted to be engaged by a fork 94, the upper end of which is secured rigidly by means of a pin 97, upon a horizontally disposed shaft 96. The opposite ends of the shaft 96 are slidably disposed in openings located in the casing 82 and cover 82' in such position that the forward end of said shaft is engageable by the adjacent rear end of the rod 61. When the rod 61 is moved rearwardly to cause the engagement of the gear 66 with the reverse idler 67, the rod 96 is also engaged, after a predetermined movement of the rod 61, and is moved to such an extent as to disengage the teeth 86 and 87. A spring 98 mounted on the rod 96 between the fork 94 and the cover 82', tends to maintain the rod in its forward position wherein the teeth 86 and 87 are engaged, but is not strong enough to push the shift bar 61 from reverse to neutral position.

Teeth 86 on the movable element 77 of the sprag device have tapered leading edges 101 formed at a slight angle to the center of rotation of the shaft 26 and adapted to cooperate with oppositely disposed trailing edges 102 of the teeth 87 formed on the shifter member 88. The angles of these teeth are such as to form complementary engaging surfaces between the members 77 and 88 substantially equal to the angle of rest or repose for the materials from which these parts are constructed. The angle of repose may be defined as follows: if two bodies are in contact with each other and a force is applied to one of said bodies at an angle to a normal to the contacting faces of said bodies, the body to which the force is applied will not move if the tangent of said angle is equal to or less than the coefficient of friction between said surfaces. Therefore the angle formed by the line of action of the force, with the normal to the surfaces is the angle of repose, if the tangent of that angle is equal to the coefficient of friction of the materials in contact. In the case of a pawl and ratchet mechanism to be designed so that a small force applied to the pawl would hold the pawl in engagement with the wheel, or a small force would separate the pawl from the wheel when under load, it is necessary to locate the pivot point so that the load would tend to force the pawl out of engagement with the wheel, and as follows: Draw a line thru the center of pressure and normal to the load holding faces in the direction of the pawl pivot point; then draw a line thru said center of pressure and on an angle to said normal and lying between said normal and the center of rotation of said ratchet wheel, the tangent of this angle to be equal of the coefficient of friction of the materials forming the said load holding faces; then locate the pawl pivot point on this line. The angle thus formed is known as the angle of repose.

If the design is to be such that the load will separate the pawl from the wheel and that only a relatively small force would be necessary to hold the pawl in engagement with the wheel, then the angle above referred to must be slightly greater than the angle of repose; if it is desired to have the pawl stay in engagement when under load and be able to be disengaged by a relatively small force then the angle above refered to must be equal to or slightly less than the angle of repose.

Of course it is understood that in a practical design, some allowance must be made for the friction of the pawl pivot point in locating said pivot point in respect to said normal. In other words if it is desired to have the pawl separate from the teeth when under load, and be such that a small force will prevent separation the angle of the line passing thru the pawl pivot center to the normal must be greater than it would be were the pawl pivot center frictionless.

In as much as there is considerable friction between the teeth 89 and 91, which friction must be overcome when shifting the member 88 to the rear, the angle of the faces 101 and 102 would have to be much greater than would be necessary were the contact, between the teeth 89 and 91 frictionless or substantially so, in order that the axial component of the torque force to be such that a slight force could separate the teeth 86 and 87 or hold them in engagement as the case may be.

Referring to Fig. 20, there is shown a fragmentary drawing of two relatively movable elements or teeth F and G having their engaging faces X and Y on an angle C and in contact as a result of forces A and B acting on the elements in the direction indicated by the arrows. If the angle C is an angle whose tangent is equal to the coefficient of friction of the elements F and G, then the elements will remain in a state of rest or repose with respect to each other but will be on the verge of separating under influence of the load or the forces A and B. If, however, the faces X and Y are formed on an angle E slightly greater than the angle C, then the elements will separate under influence of the loads or forces A and B but it would require only a small force exerted along the line O—O to hold them in engagement as the angle E is only slightly greater than the angle of repose C. Should the faces X and Y be formed on the angle D, which angle is slightly less than the angle of repose C, then the elements F and G will not separate under the load A and B, but only a small force will be required to separate the elements F and G. If the angle of the faces X and Y was made appreciably greater than angle E, then a large force would be required to prevent the elements from separating under influence of the load A and B, and conversely if the angle of the faces X and Y should be placed on the line O—O, then a large force would be required to separate the elements F and G.

If we assume that the element G is a load-holding member such as the tooth 86 (Fig. 2) or the face 234 of the ratchet 214 (Fig. 19), and cannot move in the direction of the arrow B', and that the element F can move in the direction of the arrow A' such as the tooth 87 (Fig. 2) or the pawl 238 (Fig. 19), but in doing so must overcome friction of a guiding device such as the friction between the splines 89, 91 (Fig. 1) or the friction of the pawl pivot 241 (Fig. 19), then the angle of repose C must be larger than it otherwise would be if there were no friction to resist movement of the element F in the direction of the arrow A'. With friction present and the elements F and G being designed so as to separate under load, then the angle E would have to be increased so that the component of the forces A and B in the direction of the arrow A' would be a little more than the force necessary to overcome the friction of the guiding device and consequently only a small amount of force would be required to hold the elements in engagement.

With the above-mentioned friction present in a device where it is desired that the elements would not separate under the influence of the load but that a small force applied in the direction of the arrow A' would separate them, then the angle D must be increased to a point where the component of the forces A and B in the direction of the arrow A' would be not quite enough to overcome the friction of the guiding device, so that a small force applied to the element F in the direction of the arrow A' would cause separation of the elements F and G. The angles of the teeth may be slightly above or below the angle of rest or repose of the structure. If the angle of the teeth is slightly above the angle of repose or rest, only a slight force would be required to hold the teeth 86 and 87 in engagement, which force could easily be overcome for the purpose of disengaging the teeth. Such force could be provided by the spring 98 so that if it was desired to move the teeth 86 and 87 out of engagement, the force of the spring 98 only need be overcome. If the angle of the teeth is slightly below the angle of rest or repose, there would be sufficient purchase between the teeth to hold themselves in engagement, and only a relatively light force would be required to move the same out of engagement. However, when the member 88 tends to rotate in the direction of the arrow, see Fig. 2, there will be sufficient purchase between the teeth 86 and 87 in either event to cause the member 77 to be driven therewith, in which event the member 77 will be locked to the stationary member 79 by the rollers 84 disposed therebetween, for the purpose of locking the shaft 26 against reverse rotation resulting from a tendency of the vehicle to move rearwardly. Should it be desired, however, to move the shifter member 88 so to disengage the teeth 86 and 87, the purchase between the teeth is not so great as to prevent their separation even under the load which might be imposed thereon by the force exerted upon the teeth in holding the vehicle from moving rearwardly. The oppositely disposed surfaces of the teeth 86 and 87 may be constructed in any suitable manner, as for example, in parallel relation to the axis of the shaft 64, as is indicated at 103 and 104 respectively.

The outer extremities or ends of the teeth 86 and 87 are also formed at a slight angle with respect to a plane normal to the axis of the shaft 64, the angle of these teeth being such as to practically render it impossible to engage the teeth from a disengaged position when the members 77 and 88 are moving in the direction of the arrows on Fig. 2. For example, were it possible to engage the teeth when the members were moving in this direction, or in other words when the vehicle was moving rearwardly, as occurs with the transmission in reverse, the member 77 would immediately lock the two parts rigidly to the frame through the rollers 84. This would cause an undesirable sliding of the road wheels of the vehicle and might even cause breakage of some of the teeth of the members if the vehicle were moving rearwardly at any speed. In any event, the vehicle would be brought to a stop more quickly than it should be, and this might result in considerable discomfort and perhaps injury to the occupants or load being carried by the vehicle.

Under normal conditions, when the engine is being employed to drive the vehicle forwardly, the rod 61 of the gear shift mechanism does not engage the rod 96 of the sprag device, and consequently the teeth 86 and 87 remain in engagement and are operable for preventing rearward movement of the vehicle should the latter be stopped upon any inclined surface which might tend to cause movement in this direction. Should the vehicle be stopped under such circumstances, the rearward rotation of the vehicle wheels will be immediately effective in rotating the member 88 in the direction of the arrow in Fig. 2, which is directly opposite the direction of its rotation when the vehicle is moving forwardly, and with the teeth 86 and 87 engaged, the member 77 will be rotated in such manner as to lock the rollers 84 against the stationary member 79.

Under such circumstances, the sprag mechanism will serve to lock the vehicle wheels to the frame, and consequently the vehicle will remain stationary even without applying the brakes. However, if it is desired under such circumstances to release the sprag device to permit the vehicle either to move rearwardly under influence of gravity or to drive it rearwardly under the influence of the engine, the shift lever 62 is moved into reverse position and as a result of which motion, the teeth 86 and 87 are disengaged by the action of the rod 61 in moving the rod 96 against the spring 98. By reason of the formation of the engaging surfaces of the teeth 86 and 87 at an angle slightly above or below the angle of repose or rest for the materials of the two parts, only a small amount of force will in either event be required to slide the teeth relative to one another. If the clutch is held out of engagement, the vehicle will be permitted to coast rearwardly, or it can be driven in such direction by the engine merely by permitting the main clutch elements to become engaged.

After having permitted the vehicle to move in this direction, as far as is desired, the brakes may be employed to bring the vehicle to rest, or the gear shift lever 62 may be moved to any forward driving position, and the engine may be employed for stopping the rearward motion of the vehicle and thereafter driving it forwardly. The operation of the gear shift lever 62 which results in the release of the rod 96 does not cause immediate engagement of the teeth 86 and 87 by reason of the inclined ends of the teeth hereinbefore described, which hold the teeth 86 and 87 out of engagement until the member 88 is substantially at rest relative to the member 77. Thereafter the teeth will be moved into engagement by the spring 98, as the vehicle starts forwardly under the influence of the engine.

The structure disclosed by Fig. 10 illustrates another form of clutch teeth which will normally prevent the vehicle from being rapidly stopped when moving rearwardly, and the shifter member 88 is released. In this structure, teeth 106 and 107', employed upon the elements 77 and 88, respectively, are substantially rectangular in formation and are of so near the same width as the spaces between the teeth upon an opposite member that the spring 98 will be incapable of meshing the teeth 106 and 107' until the teeth are substantially at rest relative to one another. While the teeth disclosed in this figure could be disengaged when under load by applying a considerable force upon the shift lever 62, when it is moved into reverse position, the fact that the sides of the teeth are substantially parallel to the axis of the shaft 64 will not permit them to be released as easily as though they were constructed at an angle to such axis as is done in the structure disclosed by Fig. 2.

In the structure disclosed by Figs. 4 and 5, there is illustrated a slightly different form of sprag device and in which figures, the reference numerals heretofore employed are applied to parts substantially similar to those to which the reference numerals are applied in the structure disclosed by Figs. 1 and 3.

In these structures, the inner element 77 of the overrunning clutch or one-way connection or brake is provided with a rearwardly projecting part 107 from the outer edge of which, teeth 108 project outwardly in a radial direction. These teeth are disposed directly opposite teeth 109 formed on the adjacent edge of the sleeve 71. Disposed outwardly of the pairs of teeth 108 and 109 is a slidable ring 111 on the inner surface of which are formed teeth 112 which are adapted to mate with the teeth 108 and 109 except that they are long enough to overlap both sets of teeth disposed inwardly thereof. A groove 113, formed in the outer surface of this ring, is adapted to receive a fork 114 which is secured rigidly upon a short shaft 116 mounted slidably in the sprag casing 82 and the cover 82' in substantially the way the shaft 96 is mounted. The shaft 116 is provided with a spring 117 between the yoke 114 and the end cover 82', and in addition thereto, a spiral spring 118 is disposed between the ring 111 and the adjacent edge of the enlarged portion of the sleeve 71.

The stationary element 119 of the overrunning clutch, brake or connection employed in the structure illustrated by Fig. 4, is secured against the inner surface of the casing 82 by bolts similar to those indicated at 81 in Fig. 3. The rollers 84 employed in this structure are held in position between the moving and stationary elements 77 and 119, respectively, of the clutch, brake or connection by annular rings 122 and 123 secured respectively to the elements 77 and 119.

In the structure disclosed by Fig. 5, the stationary element 126 is provided with a plurality of teeth or splines 127 upon the outer surface thereof which cooperate with teeth or splines 128 formed upon the inner surface of the casing 82. These teeth or splines may be made with a slip fit so that the stationary element can be inserted or removed without resorting to the expedient of removing and replacing bolts such as those indicated at 81 in the preceding figures.

In the structure as illustrated by Figs. 4 and 5, the sprag device operates responsive to the movement of the gear shift lever 62 into reverse position, which causes the rod 61 to engage the rod 116, as a result of which movement the sleeve or collar 111 is moved rearwardly in opposition to the spring 118 until the ring 111 will rotate freely with the teeth 109 without engaging the teeth 108. When the ring 111 is in this position, the vehicle can be made either to coast or be driven rearwardly as desired.

The rearward and forward extremities of the teeth 108 and 112, respectively, are inclined with respect to a plane normal to the axis of the shaft 62, as is indicated at 131, and with which construction the teeth 112, when once released from the teeth 108, cannot be made to engage the latter again until the two sets of teeth are moving at substantially the same rate. These inclined portions 131 function substantially as the inclined ends of the teeth 86 and 87, the operation of which has heretofore been described, so that the teeth 108 and 109 cannot be interconnected while the vehicle is moving rearwardly. It will be considerably more difficult to disconnect the teeth 108 and 109 when a load is applied thereto, than is the case with the teeth 86 and 87 employed in the structure disclosed by Fig. 1.

In the structure disclosed by Fig. 6 the inner element 133 of the overrunning clutch employed in the sprag device is secured directly upon the splined portion 69 of the shaft 26, and the outer element 134 is freely rotatable in one direction with respect thereto. Rollers 84 secured between the aforesaid inner and outer elements are confined within the outer element 134 between discs or annular rings 137 and 138 secured to the outer element adjacent the opposite edges thereof. Formed on the outer surface of the outer element 134 are teeth 139 which are adapted to mesh with similar teeth 141 located upon the inner surface of a slidable ring 142 located outwardly thereof. The teeth 141 also are adapted to mesh with similar teeth 143 located upon and extending radially from the outer surface of a laterally extending part 144 of an annular collar 147 which is secured between the transmission casing 28 and the sprag casing 82. The collar 142 may be shifted in one direction or another axially of the shaft 26 by the movement of a curved fork 149 which is secured upon an intermediate portion of a short shaft 151 located in the casing 82 directly opposite the shift rod 61. A spring 152 is employed upon the shaft 151 to maintain the ring 142 normally in position to engage the teeth 141 with the teeth 143.

In such position, the sprag device will operate as has been heretofore described, to prevent the rearward motion of a vehicle with which it is employed. When the shift lever is moved into reverse position, however, the rod 61 will engage the rod 151, and the ring 142 will be moved rearwardly into a position directly opposite the teeth 139 and out of contact with the teeth 143. In such event the ring 142 will rotate with the outer element 134 of the overrunning clutch without locking the rear wheels of the vehicle to the frame.

In the structure disclosed by Fig. 6, the forward ends of the teeth 141 and the rearward ends of the teeth 143 may be constructed with inclined surfaces such as are indicated at 131 in Fig. 7, for the purpose hereinbefore described.

In Fig. 11 there is disclosed a structure somewhat more economical to construct in which the outer element 134 of the overrunning clutch is provided with a relatively narrow flange having projecting therefrom teeth 154 which are adapted to be engaged by relatively long and inwardly disposed teeth 156 located upon the inner surface of an annular ring 157 disposed therearound. The forward edges of the teeth 156 are adapted under all circumstances to engage teeth 158 formed radially upon an elongated projection 159 extending from the ring 147 and which projection is similar to the projection 144 disclosed in the structure illustrated by Fig. 6. In Fig. 11, however, the teeth 158 are long enough to permit the ring 157 totally to be disengaged from the teeth 154 when moved forwardly in response to the operation of a lever 161 located along one side thereof.

This lever is pivotally secured to the casing 82 by a pin 162 projecting through the casing and the lever intermediate the opposite ends thereof. The lower end of the lever is secured to the side of the ring 157 by a pin 163 whereas a curved upper portion of the lever is located in such position as to be engaged by the head of a pin 164 which is slidably disposed in an opening in the casing 82 and which is located directly behind the outwardly extending end of the rod 61. The upper end of the lever 161 is held in position against the head of the rod 164 by a spring 166, the rear end of which is disposed against the casing 82.

When the rod 61 is moved rearwardly in response to the movement of the gear shift lever 62 into reverse position, the lever 161 is tilted upon the pin 162, and the ring 157 is moved forwardly in response to the forward movement of the lower end of the lever. This movement of the ring 157 is great enough to permit the teeth 154 to be entirely disengaged from the teeth 156 of the ring 157 and in which event the outer element 134 of the overrunning clutch employed is free to rotate in either direction. Consequently, the vehicle may be allowed to move under its own inertia rearwardly or may be driven in the same direction in response to the operation of the engine.

For releasing the sprag device illustrated in Figs. 4, 5, 6, 8, 10 and 11 so that the gear shift lever may be shifted easily into reverse position, there may be employed a braking mechanism such as that illustrated by Fig. 9 and in which the brake shoes are so constructed as to move the vehicle slightly forwardly when the brake is applied. This brake is one such as might be employed on one of the road wheels of the vehicle illustrated by Fig. 8. It consists principally of a brake drum 168 which is secured rigidly to the wheel and within which there is located a pair of full floating brake shoes 169 and 171. Each of these shoes is provided with a brake band 172 formed of any suitable wearing material and is held in such position as to be capable of limited circumferential movement upon pins 175. At the top the brake shoes 169 and 171 are provided with large openings 174 for receiving the pins 173 and adjacent the opposite ends thereof other large openings are provided for receiving the pins 175. In addition thereto, spiral springs 176 are employed on opposite sides of the shoes at pins 175 to permit a limited amount of lateral movement of such ends. Pins 173 and 175 all are secured rigidly to a stationary part of the vehicle surrounding the axle thereof and outwardly from which projects a skirt indicated at 177 which surrounds the brake drum 168 to prevent the entrance of dirt thereto and to prevent oil from escaping therefrom. The lower ends of the shoes 169 and 171 are held adjustably together by a mechanism indicated at 178 which is provided with a knurled adjusting wheel 179 by which the relative position of the ends of the shoes may be varied to tighten the brake bands within the brake drum 168.

Between the upper ends of the shoes 169 and 171 there projects through the stationary part of the braking mechanism an operating shaft indicated at 181 on the inner end of which there is secured rigidly a lever 182. This lever projects downwardly and terminates in an end portion located just below the adjacent upper ends of the brake shoes 169 and 171, and here is secured pivotally by a pin indicated at 183, to the lower end of a floating cam mechanism indicated generally at 184. The cam mechanism 184 comprises a pair of plates 186 and 187 which are held in spaced relation by a portion of the pin 183 at the lower end thereof, and by blocks 189 and 191 disposed in spaced relation adjacent the upper extremities thereof in such position as to be substantially equal distances on opposite sides of the axis of the shaft 181. The blocks are held in position between the plates by pins indicated at 192.

Normally the upper ends of the shoes 169 and 171 project a short distance in between the plates 186 and 187 and there are in position to be engaged by the blocks 189 and 191. The block 189 is positioned a little nearer the end of the shoe 169 than is the block 191, and the latter conversely is nearer the end of the shoe 171 than the former. In this position, assuming the lower end of the arm 182 to be rotated in the direction of the arrow on Fig. 9, the block 189 will engage the end of the shoe 169 and the block 191 the end of the shoe 171. The two plates 186 and 187 therefore will act as a lever with a load applied at 183 by the arm 182, a fulcrum at 189 acting against the end of the shoe 169 and another load at 191 against the end of the shoe 171. Since the forces applied at 183 and 191 are in the same direction and are opposed by the reaction at 189, the latter will be equal to the sum of the forces at 183 and 191 and consequently greater than the force applied at 191 alone. With the greater force applied at 189, the upper end of the shoe 169 will be thrust against the inner surface of the brake drum 168 and thereafter the resulting circumferential movement of the shoe 169 following the further movement of the block 189, will tend to rotate the drum 168 in a counter-clockwise direction. Resulting from this slight movement of the drum, and consequently the wheel to which the drum is attached, the shoe 169 and 171 will be progressively brought into contact with the entire inner surface of the drum from the upper end of the shoe 171 to the upper end thereof. When the two shoes are thus brought entirely in contact with the inner surface of the drum, the further tendency of the drum 168 to rotate will be eliminated, and the brake drum and shoes thereafter will remain in a uniform relation to one another.

This slight movement of the wheel to which the brake drum 168 is attached, will also tend to rotate the propeller shaft 27 to a slight extent in the same direction the shaft would be rotated were the vehicle driven forwardly under the influence of the engine. Assuming a sprag device, such as that illustrated herein, to be employed in the vehicle, the aforesaid slight forward rotation of the propeller shaft 27 will immediately relieve a portion or substantially all of the load being carried by the rollers 84 thereof, the same as the load on these rollers would be relieved in the event the vehicle were driven forwardly under the influence of the engine. Inasmuch as whatever load is carried by the rollers 84 is transmitted through a shifting ring such as is employed in any of the figures disclosed herein, it is apparent that the shifting ring can be easily moved in response to the operation of the gear shift lever, whenever the braking mechanism is so applied as to tend to rotate the propeller shaft 27 forwardly. Hence the only thing which it is necessary to do in order to relieve the load upon a sprag device such as that illustrated herein, is merely to apply the brakes in a vehicle equipped with a mechanism such as that illustrated by Fig. 9, and thereafter the gear shift lever can be easily shifted into reverse position.

In a motor vehicle equipped with a sprag device and such braking mechanism, it is possible to employ clutch teeth such as are illustrated in Figs. 7 and 10 and in which the sides of the teeth are all parallel to the axis of the shaft supporting them. A braking mechanism such as that illustrated in Fig. 9 is not essential in a vehicle with a sprag device having clutch teeth such as are illustrated in Fig. 2, inasmuch as the engaging surfaces of the teeth in this structure are set at approximately the angle of rest for the materials employed, and consequently, in such case, little difficulty will be encountered in shifting the clutch.

In the modification illustrated in Figs. 13 and 14, a hub 200 slidably splined to the portion 69 of the driven shaft, comprises the internal member of an overrunning clutch which is biased to the left, looking at Fig. 13, by a spring 202 disposed around the splined portion 69 of the driven shaft, and between the hub 200 and a speedometer gear 204. The outer member 206 of the overrunning clutch may be provided with a lateral set of jaw teeth 208, similar to the teeth 87 disclosed in Fig. 2, and which are adapted to mesh with a set of lateral jaw teeth 210 similar to the jaw teeth 86 illustrated in Fig. 2, and the function and operation of the jaw teeth 208 and 210 are identical with that of the jaw teeth 86 and 87 illustrated in Figs. 1 and 2.

As shown, the device illustrated by Figs. 13 and 14 is operative to hold the vehicle from moving rearwardly. Movement of the shift lever 62 into the reverse position will move rod 61 to the right, looking at Fig. 13, for the purpose of shifting the teeth 208 on member 206 out of engagement with the teeth 210 of the member 212 so that the overrunning clutch member 206 will rotate reversely with the driven shaft 26. Subsequent movement of the shift lever out of reverse position will move the rod 61 to the left, looking at Fig. 13, whereupon the spring 202 will be operative to move the teeth 208 on the sliding overrunning clutch into engagement with the teeth 210, but only when any relative rotation between the teeth has been substantially eliminated.

In the modifications illustrated in Figs. 15 to 17, inclusive, the outer member 214 of the overrunning clutch is provided with a set of external radial teeth 216 having faces 218 eccentrically disposed with respect to the axis of rotation of the member 216, and with beveled or tapered leading edges 220. A lever 222 pivotally secured at 224 to the transmission casing is provided with a head 226 having a beveled forward edge 228 and adapted to drop into any one of the interstices disposed between the teeth 216. The beveled edges 220 on the teeth 216 and 228 on the head 226 are slightly below the angle of rest or repose for the materials out of which these parts are constructed, so that there is sufficient purchase between the tapered edges to hold the head 226 in the position shown, even though the member 216 may tend to rotate in a clockwise direction due to a tendency of the vehicle in which the device is used, to move rearwardly.

The rear end of the rod 61 is provided with a cam member 230 which is adapted to engage an oppositely disposed cam member 232 provided on the lever 222 for the purpose of lifting the head 226 out of engagement with one of the teeth 216 when the shift lever is moved to reverse gear position. A spring 234' connected at one end to the lever 222 and at the other end to the sprag casing is provided for resiliently holding the head in engagement with one of the teeth 216, so that when the rod 61 is moved forwardly, the head 226 will be moved downwardly to engage one of the teeth 216, except as hereinafter described. The eccentric faces 218 of the teeth are adapted to prevent the head from engaging the teeth until the clockwise speed of rotation of the member 214, looking at Fig. 17, has practically been eliminated. It will, of course, be understood that when the vehicle is moving rearwardly, the member 214 will be locked to the member 209 of the overrunning clutch which is rotating in a reverse direction with the driven shaft 26.

To permit the vehicle in which the sprag device has been incorporated to be moved rearwardly, whenever such is desirable otherwise, than through the agency of the engine of the vehicle, the modification illustrated in Figs. 15 to 17, inclusive, is provided with means for rendering the sprag device inoperative when the shift lever of the transmission is returned to neutral position and permitted to remain in said position subsequent to moving the shift lever out of reverse position.

To that end a lever 250 is pivotally secured to a lug 252 provided on the rearward wall of the transmission casing and is biased by spring 251 so as to engage a notch 254 provided in the side of the cam member 232 when the head 226 of the lever 222 has been shifted out of engagement with one of the teeth 216 subsequent to manipulation of the shift lever to reverse position, as hereinbefore described. The low and reverse shift rod 61 is provided with a downwardly projecting pin 256 which is adapted to engage one arm of the lever 250 when the rod 61 is moved forwardly to place the transmission in low gear ratio for the purpose of moving the lever 250 out of engagement with the notch 254 thereby to permit the head 226 of the lever 222 to be biased into engagement with one of the teeth 216 provided on the outer member of the overrunning clutch 214.

Thus, if the shift lever is restored to neutral position subsequent to moving the same out of reverse, the lever 250 will hold the head 226 of the lever 222 out of engagement with the teeth 216, thereby permitting the vehicle in which the device has been incorporated to be moved rearwardly otherwise than through the agency of the engine of the vehicle.

The yoke rod 260 for effecting high and intermediate speed gear is provided with a downwardly projecting pin 262 which is adapted to engage one arm of a lever 264, the other arm of which engages a notch 266 provided on the lever 250, whenever the rod 260 is moved rearwardly to place the transmission in an intermediate gear ratio for the purpose of moving the lever 250 out of engagement with notch 254, thereby to permit the head 226 of the lever 222 to engage one of the teeth 216 whereby the sprag device will again be operative to prevent undesirable rearward movement of the vehicle. Movement of the yoke rod 260 to high gear position will not affect the lever 250, as the pin 262 will be moved away from the lever 264, which may be pivoted to a boss 268 rearwardly projecting from the sprag casing. The other modifications of the invention illustrated in this application may, if desired, be provided with similar devices for effecting a like result.

Referring now particularly to Figs. 18 and 19, the teeth 216 of the member 214 are provided with tapered leading edges 234 which are adapted to be engaged by a tapered edge 236 provided on a bolt 238 which is adapted to drop into one of the interstices between the teeth 216. The bolt or head 238 is carried by a lever 240 pivotally secured at 241 to the wall of the transmission casing and is resiliently held downwardly by a spring-pressed pin 242 carried by the rod 61 at the rear end thereof. The angle of the leading edge 234 of the teeth 216 and of the edge 236 of the bolt 238 is slightly above the angle of repose or rest for the material of which the parts are constructed, so that a tendency of the member 214 to rotate in a clockwise direction, looking at Fig. 19, will cam or move the head 238 out of engagement with one of the teeth 216.

When the shift lever is set for neutral or any forward speed position, the spring pressed pin 242 engages the lever 240 for holding the head 238 thereof in engagement with one of the teeth 216. Movement of the shift lever to reverse position will move the rod 61 for the purpose of bringing the cammed surface 244 of the pin out of engagement with the lever 240 whereby the bolt 238 will be moved out of engagement with one of the teeth 216 by reverse rotation of the member 214, or by the spring 248, and held in such position by a spring 248 secured at one end to the lever 240 and at the other to the casing of the sprag. Movement of the shift lever out of reverse position will move the rod 61 so that the cammed surface 244 of the pin 242 will move the head 238 downwardly for engagement with one of the teeth 216. The spring 250' is provided behind the pin 242 to permit the head 238 of the lever 240 to jump the interstices between the teeth 216 until practically all of the clockwise rotation of the member 214 has been eliminated when the head 238 will drop into one of the interstices, and the beveled surface 236 of the head will be in engagement with the tapered leading edge 234 of one of the teeth 216 and be held in such position by the force of the spring 250, for the purpose of holding the vehicle against rearward movement.

The features of my invention herein disclosed and claimed are broadly claimed in my copending application Serial No. 230,641, filed September 19, 1938, for "Sprag," such application being a continuation-in-part of this application and my application Serial No. 498,263, filed November 26, 1930, for "Brake."

While several specific embodiments of my invention have been illustrated and described, it must be appreciated that many modifications may be made in the construction thereof without departing from the scope of the invention, and for that reason I do not desire to be limited to any particular form or arrangement except in so far as such limitations are included in the following claims:

1. Reverse brake construction for a motor vehicle driving mechanism comprising a shaft having a one-way locking mechanism associated therewith for preventing rotation of said shaft in one direction, means for driving said shaft in either direction, a shift mechanism for rendering said locking mechanism inoperative to prevent rotation of said shaft in said one direction, said locking and shift mechanisms having cooperative and disconnectable axially shiftable teeth associated therewith, and means for preventing the locking of said teeth in response to the operation of said shift mechanism when said shaft is rotating in said one direction only, said last-mentioned means including a beveled end on at least one of said teeth sloping away from the load holding surface thereof so as to form with said load holding surface, an angle greater than 90°.

2. Reverse brake construction for a motor vehicle driving mechanism including a transmission and comprising a shaft having a locking mechanism associated therewith and operable for preventing the rotation of said shaft in one direction, means for arranging said transmission for rotating said shaft in either direction, said transmission having a "neutral" position, said locking mechanism being operable when said transmission is arranged for rotating said shaft in the opposite direction, an axial shifting device engageable with and disengageable from said locking mechanism for selectively rendering said locking mechanism operative or inoperative, and means integrally associated with the interengageable parts of said locking mechanism and shifting device for preventing the movement of the latter into a position to render said locking mechanism operative while there exists relative motion between said shaft and shifting device even though said transmission may be arranged in "neutral" position.

3. Reverse brake construction for a motor vehicle driving mechanism comprising a shaft having a locking mechanism associated therewith for preventing the rotation of said shaft in one direction, means for rotating said shaft in either direction, an axially shiftable tooth means for rendering said locking mechanism either operative or inoperative, and means associated with said tooth means for preventing the operation of said shifting device when said shaft is rotating at appreciable speed in said one direction only, said last-mentioned means including a beveled end on at least one of said teeth sloping away from the load holding surface thereof so as to form with said load holding surface, an angle greater than 90°.

4. Reverse brake construction for a motor vehicle driving mechanism comprising a shaft having a locking mechanism associated therewith for preventing rotation of said shaft in one direction, means for driving said shaft in either direction, means comprising axially shiftable teeth for controlling the operation of said locking mechanism, and means associated with said teeth for preventing the operation of the last means when said shaft is rotating at appreciable speed in said one direction only, said last-mentioned means including a beveled end on at least one of said teeth sloping away from the load holding surface thereof so as to form with said load holding surface, an angle greater than 90°.

5. Reverse brake construction for a motor vehicle driving mechanism comprising a shaft having locking mechanism associated therewith for preventing rotation of said shaft in one direction, means for rotating said shaft in either direction, an axial shifting device for controlling the operation of said locking mechanism, said shifting device and locking mechanism having cooperating teeth adapted normally to mesh with one another, the outer ends of said teeth being beveled in a direction sloping away from the load holding surface thereof so as to form with said load holding surface, an angle greater than 90°, so as to prevent their engagement during the rotation of said shaft at appreciable speed in said one direction only.

6. Reverse brake construction for a motor vehicle driving mechanism comprising a shaft having locking mechanism associated therewith for preventing the rotation of said shaft in one direction, means for rotating said shaft in either direction, an axial shifting device associated with said shaft for rendering said locking mechanism operative or inoperative, said locking mechanism and shifting device having cooperating teeth normally engageable for rendering said locking mechanism operative, resilient means for moving said shifting device for engaging said teeth, and means associated with said teeth for preventing the meshing thereof in response to the operation of said resilient means when said shaft is rotating at appreciable speed in said one direction only, said last-mentioned means including a beveled end on at least one of said teeth sloping away from the load holding surface thereof so as to form with said load holding surface, an angle greater than 90°.

7. In combination with a motor vehicle power transmisssion having a shaft operatively associated with the road wheels of the vehicle, mechanism associated with said shaft and automatically operable for resisting the load of said vehicle tending to rotate said shaft in one direction, shift means operable incidental to setting said transmission for driving said vehicle in one direction for rendering said mechanism inoperative, said shift means and said mechanism having cooperative axially shiftable clutch teeth so designed that they are readily disengageable when said mechanism is holding said shaft under conditions of maximum load against rotation for preventing the locking of said shift means, said clutch teeth having their load holding surfaces arranged so that a line normal thereto is at an angle to the line of direction of the force between said surfaces.

8. In combination with a motor vehicle transmission, a shaft operatively associated with the road wheels of the vehicle, a mechanism associated with said shaft and automatically operable for preventing the rotation of said shaft in one direction, a shifting device including axially shiftable disconnectable teeth operable for selectively rendering said mechanism operative and inoperative, and means associated with said mechanism and shifting device and operable for preventing the movement of the latter into a position to render said mechanism operative while there exists substantial relative motion between said shaft and said locking mechanism in said one direction only, said last-mentioned means including a beveled end on at least one of said teeth sloping away from the load holding surface thereof so as to form with said load holding surface, an angle greater than 90°.

9. In a motor vehicle transmission, a shaft operatively associated with the road wheels of the vehicle, a mechanism associated with said shaft and automatically operable for preventing the rotation of said shaft in one direction, an axially movable device including disconnectable teeth operable for rendering said mechanism either operative or inoperative, and means associated with said mechanism for preventing the operation of said device when said shaft is rotating at appreciable speed in said one direction only, said last-mentioned means including a beveled end on at least one of said teeth sloping away from the load holding surface thereof so as to form with said load holding surface, an angle greater than 90°.

10. Reverse brake construction for a motor vehicle driving mechanism comprising a shaft having locking mechanism associated therewith for preventing the rotation of said shaft in one direction, power means for rotating said shaft in either direction, a manually operable device for controlling the operation of said locking mechanism, said locking mechanism and device having axially shiftable disengageable teeth normally engageable for rendering said locking mechanism operative, said teeth having beveled ends sloping away from the load holding surface thereof so as to form with said load holding surface, an angle greater than 90°, so as to prevent the engagement thereof when said shaft is rotating in said one direction only.

11. Reverse brake construction for a motor vehicle driving mechanism comprising a fixed member, a rotatable member, automatic mechanism for preventing rotation of said member in one direction, said mechanism comprising a one-way device having a pair of elements relatively rotatable in one direction only, one of said elements being fixed to one of said members, and a disconnectable connection between the other of said elements and the other of said members, said connection comprising axially shiftable tooth means designed to prevent meshing together while any substantial relative movement exists therebetween in said one direction only and to readily permit disengagement thereof when said mechanism is employed in resisting a maximum load tending to rotate said rotatable member in said one direction, said last-mentioned means including a beveled end on at least one of said teeth sloping away from the load holding surface thereof so as to form with said load holding surface, an angle greater than 90°, and manually operable means for operating said connection.

12. In a device of the class described, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable clutch connection between the other of said elements and the other of said members, said clutch connection comprising axially shiftable tooth means having load holding surfaces in engagement, the line of direction of the force between said surfaces being at an angle to a line normal to said surfaces in engagement, said angle approximating the angle of rest of said system of mechanisms.

13. In a device of the class described, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable clutch connection between the other of said elements and the other of said members, said clutch connection comprising axially shiftable tooth means having load holding surfaces in engagement, the line of direction of the force between said surfaces being at an angle to a line normal to said surfaces in engagement, said angle being slightly less than the angle of rest of said system of mechanisms, and resilient means urging said tooth means into meshing engagement.

14. In a device of the class described, a system of mechanism including a load holding member, a rotatable member, automatic mechanism for preventing rotation of said member in one direction, said automatic mechanism comprising a one-way device having a pair of elements relatively rotatable in one direction only, one of said elements being fixed to one of said members, and a disconnectable clutch connection between the other of said elements and the other of said members, said clutch connection comprising axially shiftable tooth means having load holding surfaces in engagement, the line of direction of the force between said surfaces being at an angle to a line normal to said surfaces in engagement, said angle being slightly greater than the angle of rest of said system of mechanisms, and resilient means operable for holding said tooth means in meshing engagement.

15. In a motor vehicle transmission, a shaft operatively associated with the road wheels of the vehicle and having locking mechanism associated with said shaft for preventing the rotation thereof in one direction, power means for rotating the shaft in either direction, a manually operable device for controlling the operation of said locking mechanism, said locking mechanism and device having cooperating axially shiftable clutch members normally engageable for rendering said locking mechanism operative, and spring means normally holding said clutch members in engagement, said clutch members including disengageable tooth means so designed as to prevent the engagement thereof when said shaft is rotating in one direction, said last-mentioned means including a beveled end on at least one of said teeth sloping away from the load holding surface thereof so as to form with said load holding surface, an angle greater than 90°.

16. In a motor vehicle transmission, a load holding member, a rotatable member operatively associated with the road wheels of the vehicle, automatic mechanism for preventing rotation of said rotatable member in one direction, said mechanism comprising a one-way device having a pair of elements relatively rotatable in one direction only, one of said elements being fixed to one of said members, a disconnectable connection between the other of said elements and the other of said members, said connection comprising axially shiftable tooth means designed to prevent meshing together while any substantial relative movement exists therebetween in said one direction only, said last-mentioned means including a beveled end on at least one of said teeth sloping away from the load holding surface thereof so as to form with said load holding surface, an angle greater than 90°, and manually operable means for operating said connection.

17. In a motor vehicle transmission, a rotatable member operatively associated with the road wheels of the vehicle, a fixed member, one of said members being annular in shape and provided with clutch teeth, a one-way device comprising a pair of elements relatively rotatable in one direction only, one of said elements being directly connected to one of said members, and a disconnectable clutch including an axially shiftable annular part having teeth cooperable with the teeth of said member for connecting the other of said elements to the other of said members, said teeth being designed so that a line normal to the load holding faces thereof is at an angle to the line of direction of the force between said surfaces so as to readily permit disengagement thereof when said mechanism is employed for resisting a maximum load tending to rotate said rotatable member in one direction.

18. In combination with a motor vehicle transmission, a system of mechanisms including a load holding member, a rotatable member, automatic mechanism for preventing rotation of said member in one direction, said automatic mechanism comprising a one-way device having a pair of elements relatively rotatable in one direction only, one of said elements being fixed to one of said members, a disconnectable connection between the other of said elements and the other of said members, said connection comprising axially shiftable tooth means having load holding surfaces in engagement, the line of direction of the force between said surfaces being at an angle to a line normal to said surfaces in engagement, said angle being such that the force tending to cause separation of said tooth means is approximately equal to the purchase between the teeth due to the friction of the system, and spring means normally holding said tooth means in operative engagement.

19. In combination with a motor vehicle transmission, a system of mechanism including a load holding member, a rotatable member operatively associated with the road wheels of the vehicle, automatic mechanism for preventing rotation of said member in one direction, said automatic mechanism comprising a one-way device having a pair of elements relatively rotatable in one direction only, one of said elements being fixed to one of said members, a disconnectable connection between the other of said elements and the other of said members, said connection comprising axially shiftable tooth means having load holding surfaces in engagement, the line of direction of the force between said surfaces being at an angle to a line normal to said surfaces in engagement, said angle approximating the angle of rest of said system of mechanisms, and resilient means constraining said tooth means into meshing engagement.

20. In the drive system of a motor vehicle, a load holding member, a rotatable member associated with the road wheels of said vehicle, automatic mechanism for preventing rotation of said rotatable member in one direction for preventing retrograde movement of said vehicle, said mechanism comprising a one-way device having a pair of elements relatively rotatable in one direction only, one of said elements being connected to one of said members, a breakable connection between the other of said elements and the other of said members, said connection comprising axially shiftable tooth means designed to prevent meshing together while any substantial relative movement exists therebetween due to retrograde movement of said vehicle, spring means acting on said tooth means for resiliently urging the same into meshing engagement, said spring means and the shape of said tooth means forming the sole means for preventing said tooth means from separating when said mechanism is under the maximum load of the vehicle, and manually operable means for overcoming the action of said spring means and thereby effecting the disengagement of said tooth means.

21. In a drive system of a motor vehicle, a load holding member, a rotatable member associated with the road wheels of said vehicle, automatic mechanism for preventing rotation of said rotatable member in one direction for preventing retrograde movement of said vehicle, said mechanism comprising a one-way device having a pair of elements relatively rotatable in one direction only, one of said elements being connected to one of said members, a breakable connection between the other of said elements and the other of said members, said connection comprising axially shiftable tooth means designed to prevent meshing together while any substantial relative movement exists therebetween due to retrograde movement of said vehicle, spring means acting on said tooth means for resiliently urging the same into meshing engagement, manually operable means for overcoming the action of said spring means and thereby effecting the disengagement of said tooth means, and means to facilitate the disengagement of said tooth means by said manually operable means when said mechanism is resisting the maximum load of said vehicle tending to rotate said rotatable member in said one direction.

22. In the drive system of a motor vehicle, a shaft operatively associated with the road wheels of the vehicle, means for selectively driving said vehicle forwardly and reversely, an overrunning mechanism associated with said shaft and automatically operable for preventing reverse movement of said vehicle when said driving means is arranged for driving the vehicle forwardly, axially movable lug means associated with said mechanism and being disengageable for rendering said overrunning mechanism inoperative, a shifting device for disengaging said lug means, and means for facilitating the disengagement of said lug means, so as to permit the vehicle to be driven reversely, when said mechanism is subjected to the maximum load of said vehicle while preventing the reverse movement thereof.

23. In the drive system of a motor vehicle, a shaft operatively associated with the road wheels of the vehicle, means for selectively driving said vehicle forwardly and reversely, an overrunning mechanism associated with said shaft and automatically operable for preventing reverse movement of said vehicle when said driving means is arranged for driving the vehicle forwardly, axially shiftable lug means associated with said mechanism and being disengageable for rendering said overrunning mechanism inoperative, a shifting device for disengaging said lug means, means for facilitating the disengagement of said lug means, so as to permit the vehicle to be driven reversely, when said mechanism is subjected to the maximum load of said vehicle while preventing the reverse movement thereof, said lug means being designed to prevent meshing together while any substantial relative movement exists therebetween due to reverse movement of said vehicle, and spring means resiliently urging the same into meshing engagement.

24. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising axially shiftable tooth means having load holding surfaces in engagement, the line of direction of the force between said surfaces being at an angle to a line normal to said surfaces in engagement, spring means acting on said tooth means for resiliently urging the same into meshing engagement, said angle being such that said tooth means will be on the verge of separating under influence of the load of the vehicle.

25. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising axially shiftable tooth means having load holding surfaces in engagement, the line of direction of the force between said surfaces being at an angle to a line normal to said surfaces in engagement, spring means acting on said tooth means for resiliently urging the same into meshing engagement, said angle being such that said tooth means will be on the verge of separating under influence of the load of the vehicle, said tooth means being designed to prevent meshing together during any substantial relative movement thereof due to retrograde movement of said vehicle.

26. In the drive system of a motor vehicle, a load holding member, a rotatable member associated with the road wheels of the vehicle, means for selectively driving said vehicle forwardly and reversely, an automatic device comprising a system of mechanisms for preventing rotation of said rotatable member in one direction so as to prevent retrograde movement of said vehicle when said driving means is arranged for driving said vehicle forwardly, said automatic device being located between said load holding member and said rotatable member and comprising a one-way device having a pair of elements relatively rotatable in one direction only, one of said elements being connected to one of said members, a breakable connection between the other of said elements and the other of said members, said connection comprising axially shiftable tooth means having load holding surfaces in engagement, the line of direction of the force between said surfaces being at an angle to a line normal to said surfaces in engagement, said angle being such that the force tending to cause separation of said tooth means is approximately equal to the purchase between the teeth due to the friction of the system, and spring means acting on said tooth means for resiliently urging the same into meshing engagement.

27. In the drive system of a motor vehicle, a load holding member, a rotatable member associated with the road wheels of the vehicle, an automatic device comprising a system of mechanisms for preventing rotation of said rotatable member in one direction so as to prevent retrograde movement of said vehicle, said automatic device being located between said load holding member and said rotatable member and comprising a one-way device having a pair of elements relatively rotatable in one direction only, one of said elements being connected with one of said members, a breakable connection between the other of said elements and the other of said members, said connection comprising axially movable lug means having load holding surfaces in engagement, the line of direction of the force between said surfaces being at an angle to a line normal to said surfaces in engagement, said angle being such that the force on the movable element of said connection resulting from the torque on said lug means due to the load of the vehicle will approximate the frictional resistance to movement of said movable element set up by the torque between one of said elements and one of said members due to the load of said vehicle.

28. In a motor vehicle in combination with a transmission, a shaft operatively associated with the road wheels of the vehicle, and automatic mechanism associated therewith and operable for preventing rotation of said shaft in one direction so as to prevent downhill movement of said vehicle when said transmission is set for driving said vehicle uphill, said mechanism including axially projecting teeth having their load holding faces on an angle to the axis of said shaft whereby the axial component of the torque force due to the load of the vehicle will tend to separate said teeth.

CARL F. RAUEN.

CERTIFICATE OF CORRECTION.

Patent No. 2,251,956. August 12, 1941.

CARL F. RAUEN.

It is hereby certified that error appears in the printed specification of the above numbered patent requiring correction as follows: Page 3, first column, line 30, after the word "clutch" insert --, brake, device, mechanism or connection--; page 4, second column, line 34, after "so" insert --as--; page 7, first column, line 33, for "shoe" read --shoes--; page 10, first column, line 73, claim 14, for "mechanism" read --mechanisms--; page 11, first column, line 66, claim 21, for "a" before "drive" read --the--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.